(12) United States Patent
Nugent et al.

(10) Patent No.: US 8,386,293 B2
(45) Date of Patent: Feb. 26, 2013

(54) INITIAL CONTENT CUSTOMIZATION APPARATUS AND METHOD

(75) Inventors: David J. Nugent, Winfield, IL (US); Gregory J. Nawrocki, Winfield, IL (US)

(73) Assignee: American Spirit Data Solutions, LLC, Winfield, IL (US)

( * ) Notice: Subject to any disclaimer, the term of this patent is extended or adjusted under 35 U.S.C. 154(b) by 1121 days.

(21) Appl. No.: 12/062,217

(22) Filed: Apr. 3, 2008

(65) Prior Publication Data

US 2009/0254564 A1    Oct. 8, 2009

(51) Int. Cl.
*G06F 10/00*    (2006.01)
(52) U.S. Cl. ....................................................... 705/7.29
(58) Field of Classification Search .................. 705/7.29
See application file for complete search history.

(56) References Cited

U.S. PATENT DOCUMENTS

| | | | |
|---|---|---|---|
| 5,717,923 A * | 2/1998 | Dedrick | 1/1 |
| 6,052,730 A | 4/2000 | Felciano et al. | |
| 6,286,046 B1 | 9/2001 | Bryant | |
| 6,397,224 B1 | 5/2002 | Zubeldia et al. | |
| 6,704,787 B1 | 3/2004 | Umbreit | |
| 7,080,049 B2 | 7/2006 | Truitt et al. | |
| 7,080,077 B2 | 7/2006 | Ramamurthy et al. | |
| 7,089,224 B1 | 8/2006 | Klug et al. | |
| 7,139,723 B2 | 11/2006 | Conkwright et al. | |
| 7,260,837 B2 | 8/2007 | Abraham et al. | |
| 2002/0010757 A1 | 1/2002 | Granik et al. | |
| 2002/0095482 A1 | 7/2002 | Shuster | |
| 2002/0112027 A1 | 8/2002 | McHugh et al. | |
| 2003/0023490 A1 * | 1/2003 | Lenyon et al. | 705/14 |
| 2003/0033432 A1 | 2/2003 | Simpson et al. | |
| 2003/0065595 A1 | 4/2003 | Anglum | |
| 2003/0083982 A1 | 5/2003 | Fisher et al. | |
| 2003/0216964 A1 | 11/2003 | MacLean et al. | |
| 2004/0133440 A1 | 7/2004 | Carolan et al. | |
| 2004/0133480 A1 * | 7/2004 | Domes | 705/26 |
| 2005/0043993 A1 | 2/2005 | Stollman et al. | |
| 2005/0120249 A1 | 6/2005 | Shuster | |
| 2006/0100928 A1 | 5/2006 | Walczak, Jr. et al. | |
| 2006/0248558 A1 | 11/2006 | Barton et al. | |
| 2007/0036341 A1 | 2/2007 | Lynam et al. | |
| 2007/0050638 A1 | 3/2007 | Rasti | |
| 2007/0078869 A1 | 4/2007 | Carr et al. | |
| 2007/0136255 A1 | 6/2007 | Rizzo et al. | |
| 2007/0219852 A1 | 9/2007 | Anglum | |
| 2008/0242221 A1 * | 10/2008 | Shapiro et al. | 455/3.06 |
| 2009/0248496 A1 * | 10/2009 | Hueter et al. | 705/10 |

FOREIGN PATENT DOCUMENTS

| | | |
|---|---|---|
| WO | WO 03/052667 | 6/2003 |
| WO | WO 03/105396 | 12/2003 |
| WO | WO 2007/051129 | 5/2007 |

* cited by examiner

*Primary Examiner* — Romain Jeanty
(74) *Attorney, Agent, or Firm* — Fitch Even Tabin & Flannery LLP

(57) ABSTRACT

A hardware platform (300) of choice can be configured and arranged to determine (101) a current need to respond to a previously unknown person with content and to then obtain (102) from that person only a modicum of personal information. The hardware platform can then use (103) that modicum of personal information to access a store of characterizing general information and thereby obtain a corresponding profile for this person. The hardware platform can then automatically and currently provide (104) initial content to this person, wherein the initial content is customized as a function, at least in part, of this profile information.

20 Claims, 3 Drawing Sheets

INITIAL CONTENT CUSTOMIZATION APPARATUS AND METHOD

TECHNICAL FIELD

This invention relates generally to providing content to a person and more particularly to the initial current provision of content to a person who is previously unknown to the content provider.

BACKGROUND

Various operating paradigms will accommodate providing content to a person who is previously unknown to the content provider. This, in fact, likely describes a primary operational constraint and fact-of-life as pertains to many content delivery mechanisms and approaches. As but one example in this regard, a new visitor to a Website is typically unknown to the operator of that Website. Accordingly, the content provider will typically design the initial content to be provided to such unknown persons to appeal to a fairly broad audience to thereby appeal, at some level, to a relatively large number of such visitors.

Though prior practice in this regard is not without some success, there are clearly numerous opportunities that remain unaddressed by such approaches. As one example in this regard, the content provider may, in fact, have content that would be of particular interest to a given previously unknown visitor. When this content comprises a niche interest within the overall scope of available content, however, the content provider will likely either decline to initially present this content or will present this content, along with a lot of other content of limited interest, in a way that can overwhelm, confuse, and/or frustrate the visitor.

The Personalized Uniform Resource Locator (PURL) seeks to address this problem by actually identifying the visitor to some sufficient degree to permit the landing page for a new visitor to in fact be customized to a greater or a lesser extent based upon that information for that particular visitor. Though PURLs can indeed facilitate an initial presentation of content that is more likely to be of potential relevance and interest to a given view, this approach also requires a considerable amount of front end preparation and, in some cases, considerable a priori preparation on the part of the hosting entity. Though useful for some application settings, these overhead requirements nevertheless present a substantial barrier to adaptation for many other application settings.

BRIEF DESCRIPTION OF THE DRAWINGS

The above needs are at least partially met through provision of the initial content customization apparatus and method described in the following detailed description, particularly when studied in conjunction with the drawings, wherein.

Figure 1:
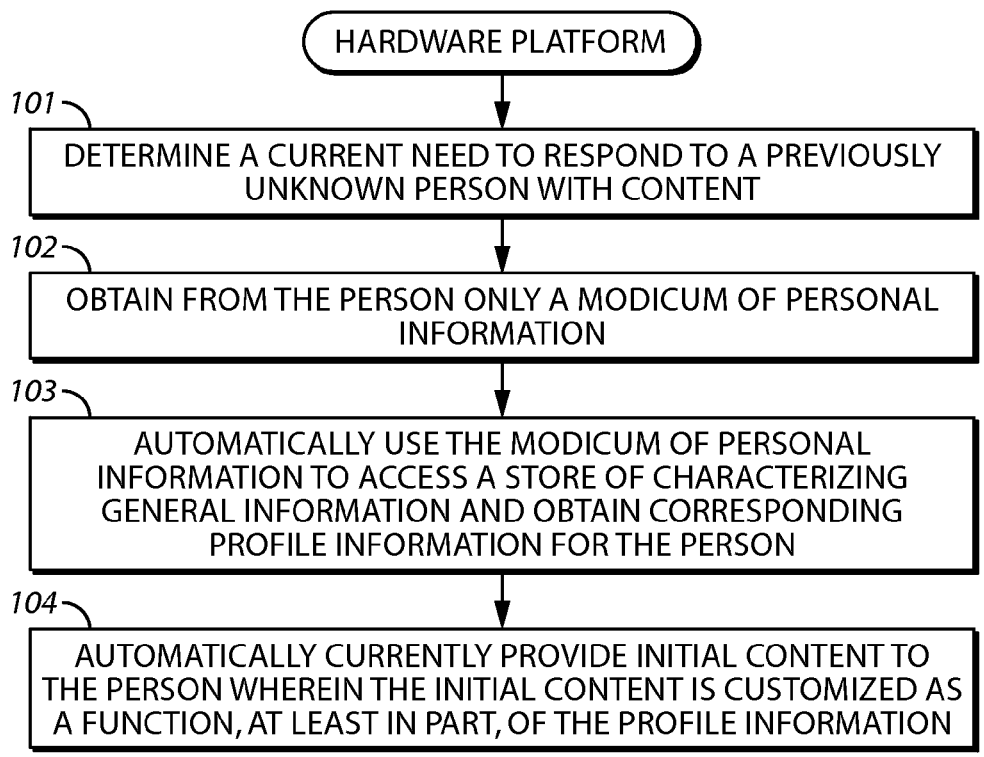
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a hardware platform of choice can be configured and arranged to determine a current need to respond to a previously unknown person with content and to then obtain from that person only a modicum of personal information. The hardware platform can then use that modicum of personal information to access a store of characterizing general information and thereby obtain a corresponding profile for this person. The hardware platform can then automatically and currently provide initial content to this person, wherein the initial content is customized as a function, at least in part, of this profile information.

By one approach, this modicum of personal information can comprise, for example, only the person's family name and their postal code. Other information might be available and/or useful in a given application setting as well. The characterizing general information, in turn, can comprise such information as demographic descriptors, consumer behavior descriptors, and/or property and material ownership information as may be gleaned through the leveraged application of the personal information. This information can then comprise, in the aggregate and/or as modified or filtered in view of one another, a profile that at least generally corresponds to the visitor.

The customization of the initial content can comprise, for example, selecting promotional content and/or an application as a function of this profile information.

So configured, a previously unknown visitor to, for example, a Website can receive, in the initial instance, a display of content that is likely to be of greater interest to them. This benefit can be achieved in many instances through the divulgation of little in the way of personal information and, in particular, little in the way of information that is ordinarily considered to be private or sensitive. As a result, both the visitor and the content provider can participate in an experience that is improved for all parties concerned.

These and other benefits may become clearer upon making a thorough review and study of the following detailed description. Referring now to the drawings, and in particular to FIG. 1, an illustrative process that is compatible with many of these teachings will now be presented. This process 100 can be implemented by any of a wide variety of hardware platforms as will be well understood by those skilled in the art. For the sake of illustration and not by way of limitation it will be presumed for the present purposes that this hardware platform comprises a World Wide Web (WWW) server. Other specific possibilities will be noted below.

This process 100 provides for determining 101 a current need to respond to a previously unknown person with content. This can comprise, for example, receiving a browser-based hit from this previously unknown person as can occur when this person directs their browser (such as Explorer or Firefox) to the Uniform Resource Locator (URL) as corresponds to a website for the content provider.

As used herein, this reference to a previously unknown person will be understood to refer to a present understanding, at the time of making the aforementioned determination, regarding the identity of the visitor. In some cases, this unknown status can be absolute in the sense that this person has never before visited this website. In other cases, this unknown status can simply reflect a present inability to correlate this visitor with a prior record of their identity. The latter might occur, for example, when the visitor uses a different computer and a different personal identifier than had been employed during a previous visit.

This process 100 then provides for obtaining 102 from this person only a modicum of personal information. As used herein, the expression "modicum of personal information" will be understood to comprise information that may be insufficient to uniquely identify the person amongst a larger population of available candidate individuals. In the United States, for example, a Social Security number can serve to specifically identify a unique individual and hence would not comprise such information.

Examples of useful information for these purposes include the person's family name (i.e., in typical western cultures, their last name) and their postal code (such as, in the United States, their five digit zip code). This information might also comprise, if desired, at least one given name for the person (i.e., in typical western cultures, their first name).

Such information, alone or viewed in the aggregate, is not assured of specifically identifying a unique individual. There can be, for example, other persons with the same name within the same given postal code. As a result, many individuals (including individuals who harbor concerns regarding their relative privacy) are comfortable with providing such information in response to a corresponding query. It is therefore possible to seek to obtain 102 this information by presenting the visitor with an opportunity to provide this information in response to a corresponding query prior to providing the visitor with an entry page that corresponds to the URL to which they have directed their browser. This can be as simple as a screen display with two or three fields in which the visitor can enter their name, their postal code, or the like. Specific textual, auditory, and/or graphic prompts can be employed as desired to assist the visitor with accomplishing this small task.

As noted above, this modicum of personal information comprises information that many people are comfortable to provide quite early in virtually any social, business, or other exchange. This information is also quite small in quantity and can typically be entered in only a few seconds by the user. It is therefore anticipated that most visitors will not be deterred or frustrated by such an opportunity.

Upon receiving this modicum of information, this process 100 then provides for automatically using the information to access a store of characterizing information and thereby obtain corresponding profile information for the visiting person. This can comprise, for example, accessing a single local store of such information and/or a single remote store of such information (where "remote" will be understood to refer to a store of information that is under different administrative control and which is also usually physically remote as well (residing, for example, in a different building than the hardware platform conducting this process 100). This step will also accommodate accessing a plurality of stores of characterizing general information. This can include different stores that may contain largely redundant information (such as different consumer data reporting stores of information) as well as stores that contain different kinds of information.

If desired, the corresponding search criteria can comprise modified versions of the personal information as is provided by the person. For example, if desired, known variations on first names can be called upon to enrich the corresponding query. To illustrate, when the visitor identifies themselves by the given name "Bob," this process 100 will readily accommodate automatically using alternative forms of that name, such as Robert, Rob, Bobby, and so forth when forming the corresponding query. Other possibilities exist in this regard such as phonetic search algorithms that can suggest alternative expressions that are phonetically identical (or similar) to a given input expression.

The specific kinds of characterizing information can and will vary from one application setting to another. Generally speaking, however, such information can comprise information regarding demographic descriptors, consumer behavior descriptors, and/or property and material ownership information. Demographic descriptors might comprise, for example, information regarding the age range, the family size, sports affinities, professional and/or academic standings, and other typical affinities, relationships, or interests. Consumer behavior descriptors might comprise, for example, information regarding local stores that person may generally visit, Internet-based shopping proclivities, and so forth. And property and material ownership information might comprise, for example, information regarding typical vehicle purchases, home ownership, and so forth of the person. Those skilled in the art will recognize and understand that these examples are intended to serve only in an illustrative capacity and are not intended to comprise an exhaustive listing of all possibilities in these regards.

As noted above, this step also provides for obtaining corresponding profile information for the visitor. This comprises forming this profile information as a function, in part or in whole, of the accessed characterizing information. In some cases, the accessed characterizing general information will itself comprise this profile information in a disaggregated form. There are other possibilities, however. In some cases, for example, it will possible to employ the name of the previously unknown visitor to add some amount of greater specificity to the gathered information.

For example, it may be generally understood that families of four within this postal code area tend to have three vehicles while families of three or less tend to have only two vehicles. When it is possible to determine, via the visitor's name, that they are a part of a four person family, it becomes possible to then determine that, generally speaking, it is likely that the visitor's family has three vehicles. Such an inference is not, of course, guaranteed but the inference can nevertheless comprise a part of a useful profile for the visitor.

In cases where characterizing information is not obtainable for a particular individual, characterizing general information derived from a subset of the obtained modicum of personal information (a postal code only for example) can be used to determine a likely general profile for an individual. Demographic descriptors might comprise, for example, information regarding the typical age range, the typical family size, sports affinities, typical professional and/or academic standings, and other typical affinities, relationships, or interests of persons residing within the indicated postal code. Consumer behavior descriptors might comprise, for example, information regarding local stores that persons within the indicated postal code generally visit, Internet-based shopping proclivities of persons within the postal code, and so forth. And property and material ownership information might comprise, for example, information regarding typical vehicle purchases, home ownership, and so forth of persons within the postal code. Those skilled in the art will recognize and understand that these examples are intended to serve only in an illustrative capacity and are not intended to comprise an exhaustive listing of all possibilities in these regards.

Using modern network-based access methodologies (such as opportunities made available via the Internet) it is possible to query the aforementioned store of characterizing general information and receive the corresponding information in a fraction of a second. For example, even when the store of information comprises a store that is administered by another entity such a transaction can often be accomplished in less than 300 milliseconds. In some cases, it may be useful to pre-arrange the query and response protocol/process as between the content provider and the store of information in order to reduce the time requirements to a relative minimum.

Some potentially useful stores of information include, but are not limited to, consumer data reporting services (such as, but not limited to, the Experian and Equifax sites).

This process 100 then automatically currently provides 104 initial content to the visiting person via a custom landing page. This initial content is customized as a function, at least in part, of the aforementioned profile information. This customization can assume any of a variety of forms. By one approach, for example, this can comprise segmenting the various candidate items of content that are presently available to initially present to the visitor and then selecting from amongst the candidates using corresponding rules regarding the selection process. This kind of informed selection processing is well understood in the art and requires no particular elaboration here.

Figure 2:
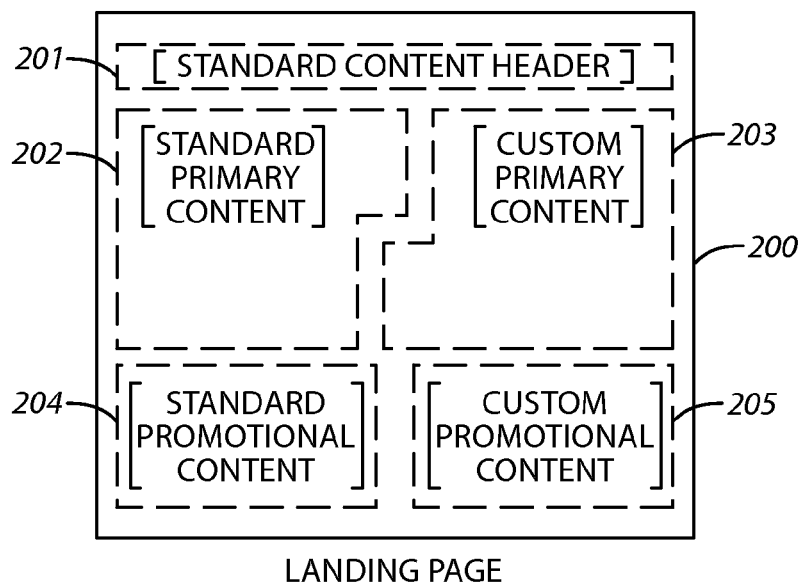
FIG. 2 comprises a schematic view of a screen shot as configured in accordance with various embodiments of the invention.

Referring now to FIG. 2, and for the purposes of illustration and not limitation, this initial content can comprise a landing page 200 as corresponds generally to a URL employed by the visitor's browser, but with some assembled content customized as a function, at least in part, of the aforementioned profile information. This landing page 200 may present a standard content header 201, standard primary content 202, and/or standard promotional content 204 that is not customized and that comprises a part of the landing page regardless of the visitor's profile. This landing page 200 can also comprise, however, custom primary content 203 and/or custom promotional content 205.

Again by way of illustration and not by way of limitation, this landing page 200 might comprise the landing page for a health club. The standard content header 201 could provide notice of this fact and the standard primary content 202 could, in turn, present information considered to be of likely interest to most site visitors. The standard promotional content 204 could, in turn, comprise promotions that the health club again considers to be usefully provided to all site visitors.

The custom primary content 203, however, can comprise content that has been specifically selected as a function of the visitor's profile information. For example, if the visitor has children, the health club may choose to promote its family programs. If the visitor is a golf enthusiast, the health club may choose to promote personal trainers that specialize in exercises designed to improve one's golf game. Note that these examples and profile strategies when applied are not necessarily exclusive of each other.

In cases where characterizing information is not obtainable for a particular individual, characterizing general information derived from a subset of the obtained modicum of personal information (a postal code only, for example) can be used to determine a likely general profile for an individual. If the visitor's postal code corresponds to a postal code in a location that is known to have a high percentage of families with young children, for example, this custom primary content 203 might comprise an article that explains the benefits of exercise for young parents. The custom promotional content 205, in turn, might comprise information advertising the health club's childcare facility.

Those skilled in the art will recognize and appreciate that such customized content (of primary or promotional nature) can, with some reasonable assurance, be of considerably greater interest to such a visitor. In fact, these are precisely the kinds of benefits and improvements that one ordinarily associates with personalized landing pages that rely upon a previously established profile of information that itself comprises more than a modicum of personal information as was previously provided by the visitor or as was based upon their actions while making a previous visit (using, for example, cookies, PURL methodologies, and so forth). In the present case, however, these same benefits are obtained in a setting where the visitor is previously unknown to the content provider and where, traditionally, the initial information conveyed must essentially all comprise standard content and not customized content.

As noted above, this process 100 relates to providing initial content that is customized for a given visitor as a function of their profile information. This reference to "initial" will be understood in context to refer to the primary destination (i.e, the landing page) as correlates to and corresponds to the URL to which the visitor's browser is directed and is not intended to refer, for example, to a preliminary entry screen that serves the purpose of obtaining the aforementioned modicum of personal information.

Figure 3:
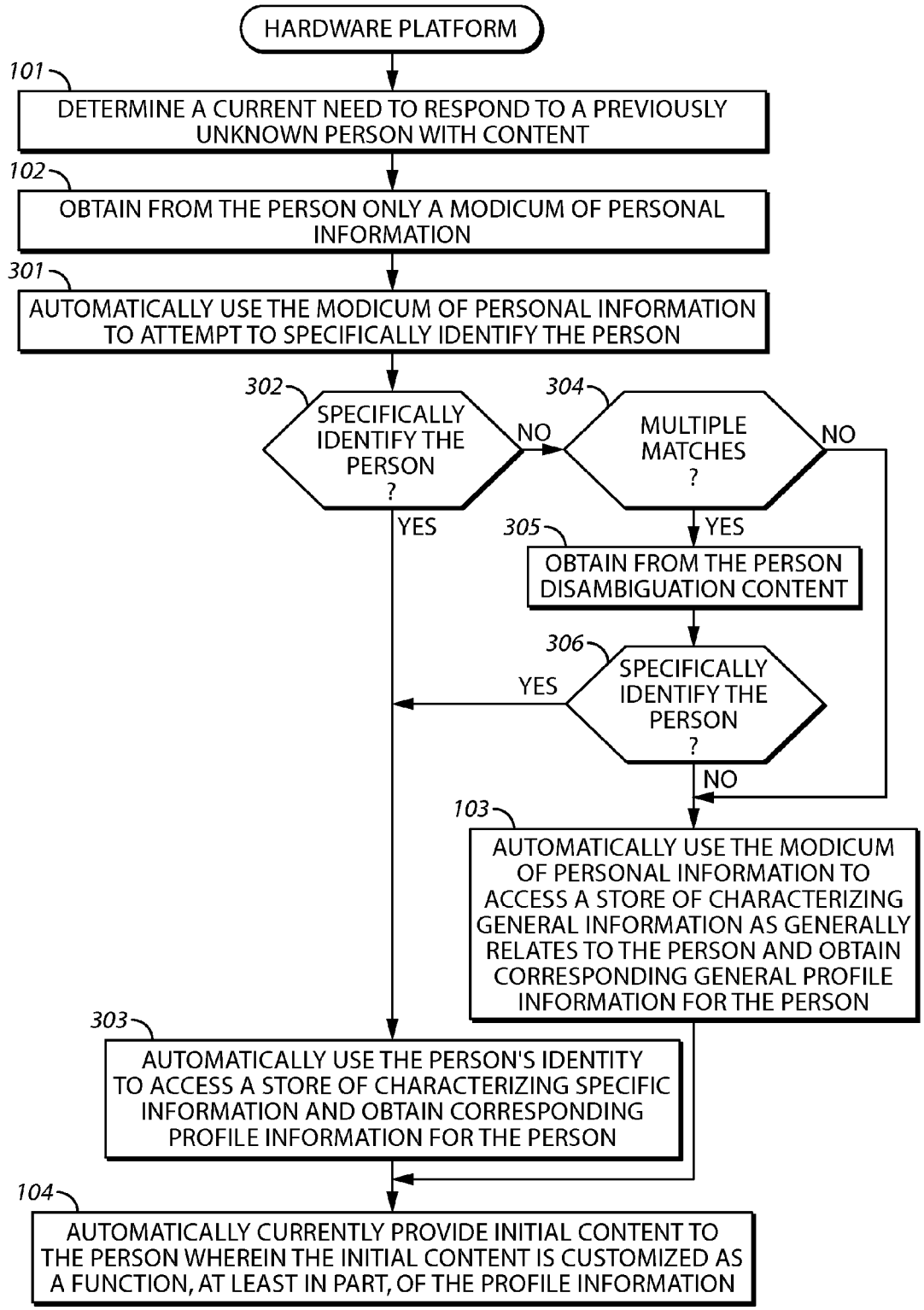
FIG. 3 comprises a flow diagram as configured in accordance with various embodiments of the invention.

In the illustrative examples provided above, the process is generally presumed to accommodate a circumstance where the visitor is not likely to be uniquely identified via the modicum of personal information. There are many application settings, however, where successfully uniquely identifying the visitor using this modicum of personal information can in fact be expected to occur for at least some visitors. Some application settings, for example, can offer sufficiently deep and rich data resources so as to make such an expectation a reasonable one. With this in mind, and referring now to FIG. 3, a somewhat modified illustrative process 300 that also accords with these teachings will be provided.

As before, this process 300 can again begin with determining 101 a current need to respond to a previously unknown person with content and then obtaining 102 from that person the aforementioned modicum of personal information. This process 300 can then provide for automatically 301 using that modicum of personal information to attempt to specifically identify this particular person. As before, this process 300 provides for using the personal information to form a corresponding query that is then typically presented to one or more remote data resources (such as, by way of one non-limiting example), a consumer data reporting entity). The latter then return corresponding data to the hardware platform. Also as before, this entire transaction can often be completed, using today's resources and networking capabilities, in less than one second.

This process 300 then provides for determining 302 whether the returned information serves to specifically identify the visiting person. By one approach, for example, this can simply comprise noting that only information for a single individual has been returned in response to the aforementioned query (queries). When true, this process 300 can then provide for automatically using 303 that person's identity to access a store of characterizing specific information and obtaining corresponding profile information for that person. By one approach, this can comprise using information as may have been already returned in response to the aforementioned query (queries). By another approach, in combination with the above or in lieu thereof, this can comprise formulating one or more subsequent queries (using the specific identity of the person) and posing those subsequent queries to one or more data resources to acquire the characterizing specific information. As before, this can then lead to automatically currently providing 104 initial content to the person wherein the initial content is customized as a function, at least in part, of the profile information.

When the aforesaid determination 302 concludes that the initial query (queries) did not result in specifically identifying the person, this process 300 can provide for determining 304 whether multiple matches have been returned. When this is true, this process 300 can then provide, if desired, for obtaining 305 disambiguation content from the person. As one simple example in this regard, when the person has identified themselves as being "Bob Walker" and information for two different Bob Walkers has been returned to the hardware platform, this step can comprise presenting information for both Bob Walkers and asking the visitor to select one as being themselves. This could comprise, for example, displaying a first Bob Walker who resides at a first residential address and a second Bob Walker who resides at a second, different residential address, along with a random selection of non-differentiating residential addresses to limit the possibility of a "lucky guess" As another example in this regard, the process 300 may pose an additional question to the person to elicit additional input from the person. This might comprise, for example, asking the person for their street of residence, the name of a family member, the name of their alma mater, and so forth.

The process 300 then provides for determining 306 whether the person's disambiguation response is sufficient to specifically identify the person. When true, the process 300 can continue as described above to automatically use 303 their (now established) identity to access the desired information and to use that information to inform the customization of the initial content being provided to them.

When the disambiguation response of the person is insufficient to permit specifically identifying the person (as when, for example, the person provides a response to the disambiguation opportunity which identifies no person in particular), or when the process 300 has earlier determined (302 and 304) that the original information failed to specifically identify the person and multiple matches were not the result of that initial query, this process 300 can then proceed as described earlier by automatically using 103 the modicum of personal information to access a store of characterizing general information as generally relates to the person and to then use 104 the corresponding profile information to provide customized initial content.

Figure 4:
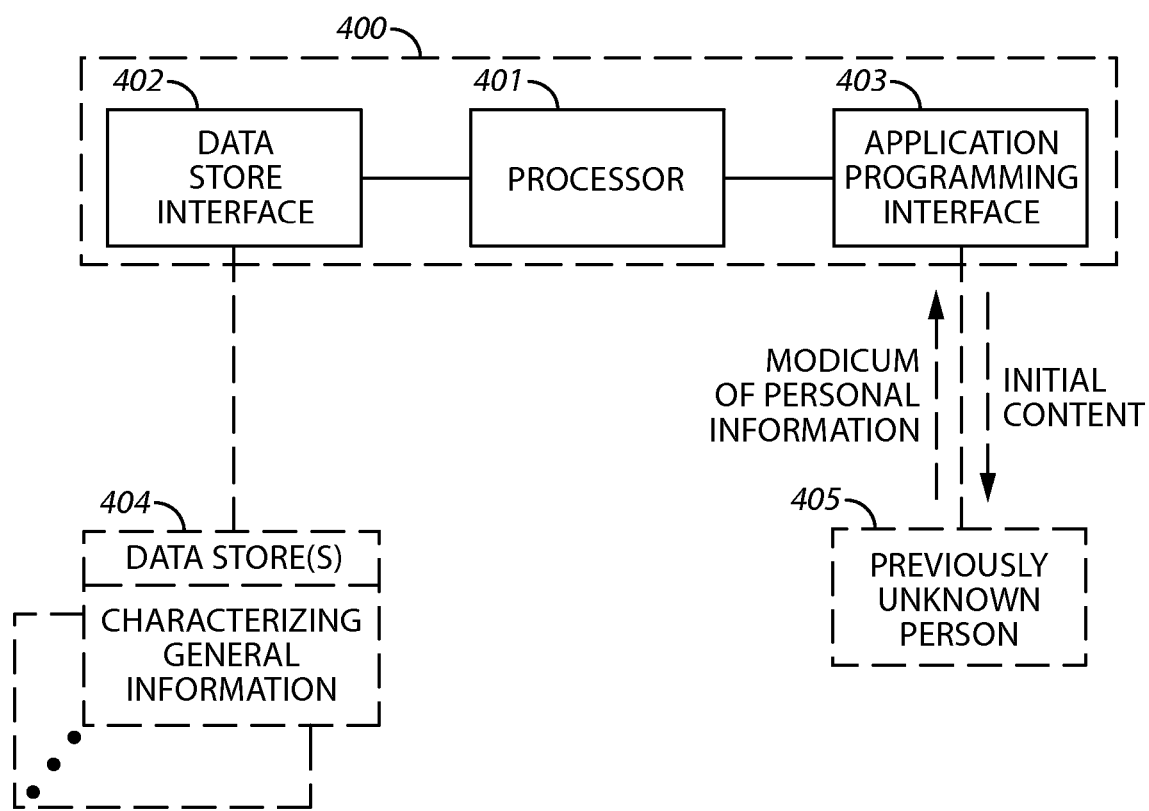
FIG. 4 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 4, an illustrative approach to such a platform will now be provided.

In this illustrative embodiment, the hardware platform 400 comprises generally a processor 401 that operably couples to both a data store interface 402 and an application programming interface (API) which may or may not be based upon any of a variety of open protocols such as web-services. Those skilled in the art will recognize and appreciate that such a processor 401 can comprise a fixed-purpose hard-wired platform or can comprise a partially or wholly programmable platform. All of these architectural options are well known and understood in the art and require no further description here.

This processor 401 can be configured and arranged (via, for example, corresponding programming as will be well understood by those skilled in the art) to carry out one or more of the aforementioned steps, actions, and functionality of the described process 100. This can specifically comprise, if desired: determining a current need to respond, via the application programming interface 403, to a previously unknown person 405 with content; obtaining from that person, again via the API 403, only a modicum of personal information; automatically using that modicum of personal information to access, via the data store interface 402, a store 304 of characterizing information and to obtain corresponding profile information for the person; and also to automatically currently provide, via the API 403, initial content to the previously unknown person 305 wherein the initial content is customized as a function, at least in part, of the profile information.

By one approach, and as noted above, the hardware platform 400 can comprise a World Wide Web (WWW) server. In such a case, the application programming interface 403 can itself comprise a browser-based interface as is known in the art. There are other possibilities as regards the hardware platform, however. For example, if desired, the hardware platform can comprise an interface to a point of sales terminal. In such a case, some or all of the information as is initially provided to a visitor to that point of sales terminal can be partially or wholly customized notwithstanding that this visitor may be previously unknown to the apparatus. As another example in this regard, this hardware platform could comprise a node that receives Short Message Service (SMS) messages.

Those skilled in the art will recognize and understand that such an apparatus 400 may be comprised of a plurality of physically distinct elements as is suggested by the illustration shown in FIG. 4. It is also possible, however, to view this illustration as comprising a logical view, in which case one or more of these elements can be enabled and realized via a shared platform. It will also be understood that such a shared platform may comprise a wholly or at least partially programmable platform as are known in the art.

So configured, those skilled in the art will recognize and appreciate that these teachings make possible a kind of personalized treatment of initially provided content that has previously only been possible for visitors who are previously known in some manner to the content provider. In a very real sense, the benefits and flexibility often associated with PURLs are now extendable in numerous ways to a static URL that is used by a vast population of previously unknown visitors. These teachings are readily leveraged for essentially any kind of content, including textual content, audio content, still images or video content, and so forth. It will also be understood that these teachings are easily scaled and will work in cooperation with a wide range of content quantity.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. As one example in this regard, it will be understood and appreciated that the above-described actions occur in real time as perceived by the visitor. The amount of time required to effect these steps might, however, be potentially reduced by using a first item of personal information as offered by the visitor to access a corresponding store of information before having received all such items of personal information from the visitor. As another example in this regard, the customization of the initial content to be presented to a previously unknown person can itself comprise, at least in part, providing an application. In such a case, the selected application may comprise a standalone application (such as a particular media playback mechanism) or might comprise a particular selection from amongst various user interfaces, supported capabilities, and so forth.

We claim:

1. A method comprising:
at a processor:
  determining a current need to respond to a previously unknown person with content;
  obtaining from the person only a modicum of personal information;
  automatically using the modicum of personal information to access a store of characterizing general information and obtain corresponding profile information for the person;
  automatically currently providing initial content to the person wherein the initial content is customized as a function, at least in part, of the profile information.

2. The method of claim 1 wherein the processor comprises a World Wide Web (WWW) server.

3. The method of claim 1 wherein determining a current need to respond to a previously unknown person with content comprises receiving a browser-based hit from the previously unknown person.

4. The method of claim 1 wherein obtaining from the person only a modicum of personal information comprises presenting the person with an opportunity to enter the personal information.

5. The method of claim 1 wherein the modicum of personal information comprises the person's family name and the person's postal code.

6. The method of claim 5 wherein the modicum of personal information further comprises at least one given name for the person.

7. The method of claim 1 wherein automatically using the modicum of personal information to access a store of characterizing general information comprises accessing a plurality of stores of characterizing general information.

8. The method of claim 1 wherein automatically using the modicum of personal information to access a store of characterizing general information comprises accessing a remote store of characterizing general information.

9. The method of claim 1 wherein the characterizing general information comprises, at least in part, at least one of:
  demographic descriptors;
  consumer behavior descriptors;
  property and material ownership information.

10. The method of claim 1 wherein automatically currently providing initial content to the person wherein the initial content is customized as a function, at least in part, of the profile information comprises, at least in part, providing initial content having promotional content that is selected as a function, at least in part, of the profile information.

11. The method of claim 1 wherein automatically currently providing initial content to the person wherein the initial content is customized as a function, at least in part, of the profile information comprises, at least in part, providing an application as function of the profile information.

12. An apparatus comprising:
an application programming interface;
a data store interface;
a processor that is operably coupled to the application programming interface and the data store interface and that is configured and arranged to:
  determine a current need to respond, via the application programming interface, to a previously unknown person with content;
  obtain from the person, via the application programming interface, only a modicum of personal information;
  automatically use the modicum of personal information to access, via the data store interface, a store of characterizing general information and obtain corresponding profile information for the person;
  automatically currently provide, via the application programming interface, initial content to the person wherein the initial content is customized as a function, at least in part, of the profile information.

13. The apparatus of claim 12 wherein the apparatus comprises a World Wide Web (WWW) server.

14. The apparatus of claim 12 wherein the application programming interface comprises, at least in part, a browser-based interface.

15. The apparatus of claim 12 wherein the modicum of personal information comprises the person's family name and the person's postal code.

16. The apparatus of claim 15 wherein the modicum of personal information further comprises at least one given name for the person.

17. The apparatus of claim 12 wherein the characterizing general information comprises, at least in part, at least one of:
  demographic descriptors;
  consumer behavior descriptors;
  property and material ownership information.

18. The apparatus of claim 12 wherein the processor is configured and arranged to automatically currently provide initial content to the person wherein the initial content is customized as a function, at least in part, of the profile information by, at least in part, providing initial content having promotional content that is selected as a function, at least in part, of the profile information.

19. The apparatus of claim 12 wherein the processor is configured and arranged to automatically currently provide initial content to the person wherein the initial content is customized as a function, at least in part, of the profile information by, at least in part, providing an application as function of the profile information.

20. The apparatus of claim 12 wherein the apparatus comprises at least one of:
  an interface to a point of sales terminal;
  a node which receives Short Message Service (SMS) messages.

* * * * *